United States Patent [19]

Takegawa et al.

[11] 4,358,234
[45] Nov. 9, 1982

[54] PART FIXING SYSTEM

[75] Inventors: Tetuo Takegawa, Yokosuka; Yoichi Kikuchi, Yokohama; Akira Mizusawa, Fujisawa, all of Japan

[73] Assignees: Nissan Motor Co., Ltd.; Nifco Inc., both of Yokohama, Japan

[21] Appl. No.: 182,005

[22] Filed: Aug. 28, 1980

[30] Foreign Application Priority Data

Aug. 29, 1979 [JP] Japan .......................... 54-119700[U]

[51] Int. Cl.³ .............................................. F16B 13/08
[52] U.S. Cl. ..................................... 411/57; 403/407; 411/182
[58] Field of Search ....................... 411/57, 58, 59, 21, 411/44, 508, 112, 111, 176, 166, 15, 182; 403/407, 406, 408; 248/217.4

[56] References Cited

U.S. PATENT DOCUMENTS

| | | | |
|---|---|---|---|
| 2,836,214 | 5/1958 | Rapata | 411/182 |
| 2,975,814 | 3/1961 | Tinnerman | 411/182 |
| 3,226,150 | 12/1965 | Menzer | 411/57 X |
| 3,272,952 | 9/1966 | McKeon | 411/57 X |
| 3,352,195 | 11/1967 | Fisher | 411/15 |

FOREIGN PATENT DOCUMENTS

| | | | |
|---|---|---|---|
| 2036238 | 1/1972 | Fed. Rep. of Germany | 411/112 |
| 2157961 | 5/1973 | Fed. Rep. of Germany | 411/57 |

*Primary Examiner*—Ramon S. Britts
*Attorney, Agent, or Firm*—Trexler, Bushnell & Wolters, Ltd.

[57] ABSTRACT

Fixation of a rear combination lamp to an automobile body is accomplished by having a plurality of stud bolts planted in the fixing flange of the lamp, causing a retaining clip for determining the position of the lamp on the automobile body to be fastened to at least one of the aforementioned stud bolts, allowing a plurality of retaining clips for absorbing the positional deviation to be fastened to the remaining stud bolts and having the retaining clips pushed into the fixing holes bored in the automobile body.

2 Claims, 10 Drawing Figures

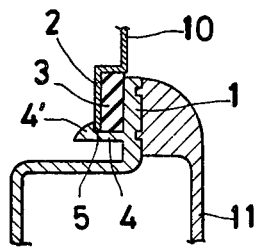
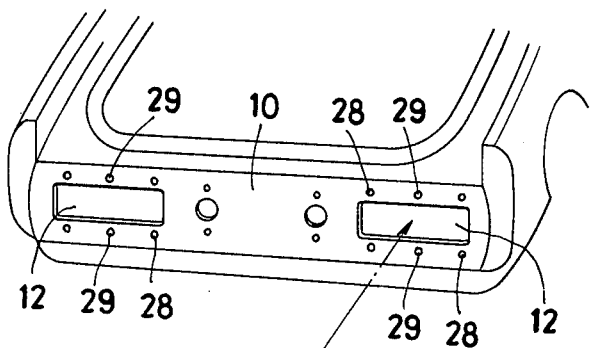
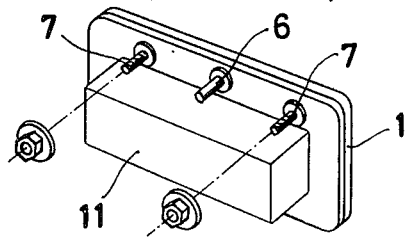
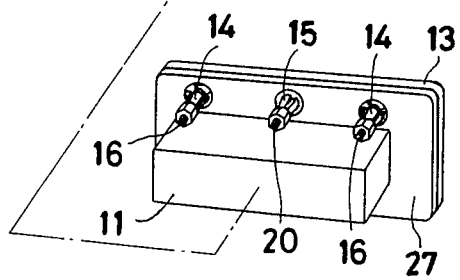
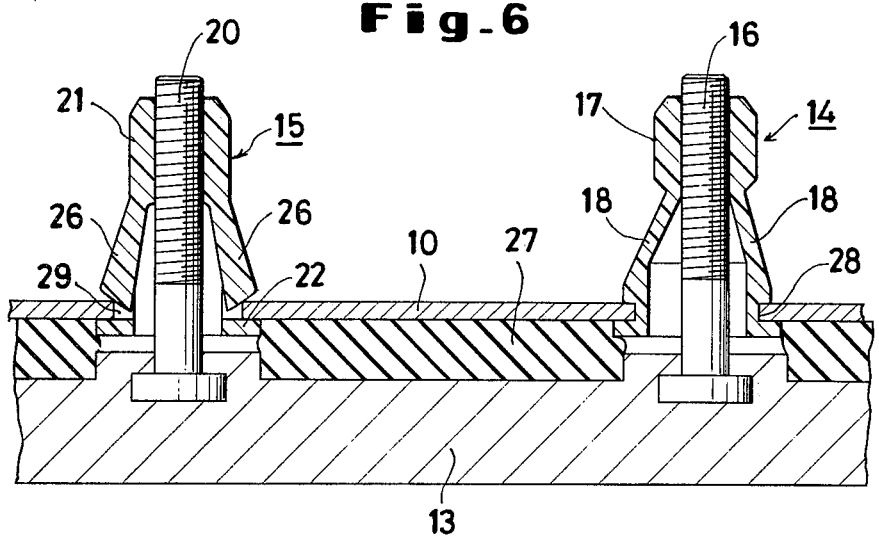

PART FIXING SYSTEM

BACKGROUND OF THE INVENTION

This invention relates to a part fixing system making combined use of one type of retaining clips for fixing the position of the part and another type of retaining clips for absorbing positional deviation of the part.

There have been suggested various methods for fixing rear combination lamps and other similar parts to automobile bodies. According to one typical method, the part, a rear combination lamp for example, is fixed onto the automobile body using bolts and nuts. This method involves many work steps. Moreover, if there should by any leakage of water into the part after it has been fixed, it becomes necessary to remove all the bolts and nuts before the part can be given the required readjustment and repair. Still further, this method has been unable to provide accurate positioning of the part relative to the automobile body.

In another method a rear combination lamp or the like is provided with a plurality of engaging clips projecting from a fixing flange of the lamp and when the lamp is pushed into a matching fixing hole in the automobile body, the engaging clips come into fast engagement with the edge surface of the fixing hole. However, in this method, when the fastness of the engagement between the plurality of engaging clips and the edge surface of the fixing hole is not sufficient, the adjoining surfaces of the lamps and the fixing hole may fail to form a perfectly watertight union and, consequently, water may leak into the interior of the lamp. This situation cannot be remedied since the individual clips cannot be tightened at will. Further, when any one of the clips breaks, the whole lamp retainer must be replaced.

With a view to eliminating the common disadvantage of most conventional methods that accurate positioning cannot be obtained for the part being fixed, yet another method has been devised. In this method, which is an improved version of the first method mentioned above using bolts and nuts, a rear combination lamp is accurately positioned relative to a fixing hole in the automobile body by causing positioning pins projecting from the flange of the lamp at positions other than the positions intended for attachment to be inserted into corresponding standard holes bored in the body and, subsequent to the positioning, by fixing the lamp onto the automobile body using bolts and nuts. With this method, however, it is impossible to fix the lamp to the automobile body with a single action.

In the various methods such as those described above, when the intervals between the adjacent locating pins, engaging claws, etc. formed on the part being fixed happen to differ, even though very slightly, from those between the corresponding fixing holes in the object, it becomes impossible to obtain fast attachment of the part. For fast attachment, therefore, some degree of positional adjustment is required either of the part being fixed or of the fixing hole(s).

SUMMARY OF THE INVENTION

One object of this invention is to provide a part fixing system which is capable of absorbing possible deviation in the intervals between fixing holes and, therefore, permitting accurate positioning of the part relative to the object.

Another object of the present invention is to provide a part fixing system capable of providing single-action fixation of the part to the object and permitting the part to be locally tightened.

To accomplish the objects described above according to the present invention, there is provided a part fixing system for fixing the part to the object by the combined use of at least one retaining clip serving to determine the position of the part relative to the object and a plurality of retaining clips serving to absorb possible positional deviation between stud bolts on the part and the corresponding holes in the object. The engaging portion of each of the fixing holes for receiving the retaining clips which serve to absorb the positional deviation is composed of four equally divided engaging pieces. These engaging pieces are so constructed that they are normally kept energized in the diverging direction and they assume a diameter smaller than the diameter of the fixing hole when they are converged to their fullest extent.

With the part fixing system of this invention, therefore, the part being fixed can be positioned accurately by use of one or two retaining clips serving to determine the position of the part and, even when there arises some degree of positional deviation between the remaining fixing holes and the corresponding stud bolts, the part can be firmly fixed to the object by use of a plurality of retaining clips serving to absorb such positional deviation. When necessary, desired tightness adjustment can be given to specific retaining clips at will.

The other objects and characteristics of the present invention will become apparent from the further disclosure of the invention to be made hereinafter with reference to the accompanying drawing.

BRIEF DESCRIPTION OF THE DRAWING

FIG. 1 is a cross section of one conventional part fixing method for fixing a rear combination lamp to an automobile body.

FIG. 2 is a perspective view illustrating another conventional method for fixing a rear combination lamp.

FIG. 3 is a perspective view illustrating the part fixing system of the present invention as it is used for fixing a rear combination lamp to an automobile body.

FIG. 4(A) is a perspective view of the retaining clip and FIG. 4(B) a cross section of the retaining clip.

FIG. 5(A) is a perspective view of the retaining clip for determining the position of the part, FIG. 5(B) a side view of the same retaining clip and FIG. 5(C) a cross section of the same retaining clip.

FIG. 6 is an enlarged, sectioned view illustrating the condition in which a rear lamp is fixed onto an automobile body by use of the part fixing system of this invention.

DESCRIPTION OF THE PREFERRED EMBODIMENT

Figure 4:
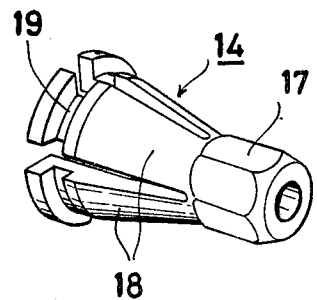
FIG. 4 illustrates a retaining clip for absorbing positional deviation in the system according to the present invention.
Figure 4:
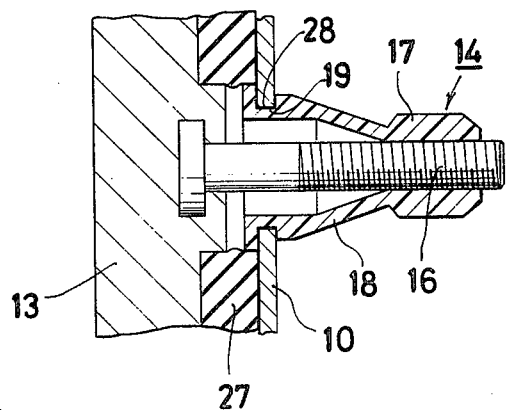

FIG. 1 is a sectioned view illustrating the condition in which a rear combination lamp is fixed to an automobile body by the conventional single-action method mentioned above wherein a plurality of engaging clips 4 are provided to project inwardly from the fixing flange 1 of the rear combination lamp 11, a seal rubber 3 is interposed between the adjoining surfaces of the flange 1 and the lamp fixing portion 2 in the automobile body 10. Fixation of the lamp to the automobile body is accomplished by pressing the fixing flange 1 of the lamp 11 against the lamp fixing portion 2 and causing the engaging claws 4' of the aforementioned plurality of engaging clips 4 to come into fast engagement with the edge of a fixing hole 5 provided in advance in the lamp fixing portion 2 on the automobile body. By this method of fixing, however, the adjoining surfaces of the lamp and the automobile body cannot be sealed water-tightly enough to preclude the possibility of water leakage when the engaging claws fail to produce as powerful a union as required and the fixing method cannot be given necessary local adjustment of tightness. When the fixing hole for receiving the engaging clips happens to have a size slightly smaller than normal or when the positions of the engaging claws deviate even slightly, the engaging claws fail to come into fast engagement with the edge of the fixing hole or they may, in an extreme case, be broken off.

FIG. 2 illustrates another conventional method referred to above adopted for fixing a rear combination lamp to the automobile body. Setbolts 7 for fixing the lamp are provided one each at the four corners of the fixing flange 1 of the rear combination lamp 11. At the horizontal middle positions between the setbolts positioning pins 6 are provided to project one each from the fixing flange 1 of the lamp. With this arrangement, the positioning pins 6 are inserted into standard holes bored in advance in the lamp fixing portion of the automobile body (not shown) in order to fix the position of the lamp relative to the lamp fixing portion and, thereafter, the lamp is fixed to the automobile body by fastening the setbolts and nuts. This method, however, has been unable to provide single action attachment of the lamp to the automobile body.

FIG. 3 illustrates an embodiment of the part fixing system of the present invention, as used for fixing a rear combination lamp 11 on an automobile body.

Referring to the drawing, retaining clips 14 adapted to absorb possible positional deviation are provided to project from the four corners of the fixing flange 13 of the rear combination lamp 11 and retaining clips 15 adapted to determine the position of the lamp relative to the automobile body are provided to project one each from the fixing flange 13 at the horizontal middle positions between the aforementioned retaining clips 14.

The aforementioned retaining clips 14 serving to absorb possible positional deviation each comprises a stud bolt 16 having the head portion thereof buried in the fixing flange 13 of the lamp 11, a nut member 17 (FIG. 4) adapted to be screwed on to stud bolt 16, four deformable engaging pieces 18 extending divergingly from one end of the nut member 17, and grooves 19 cut in the proximity of the leading ends of the engaging pieces 18.

Figure 5:
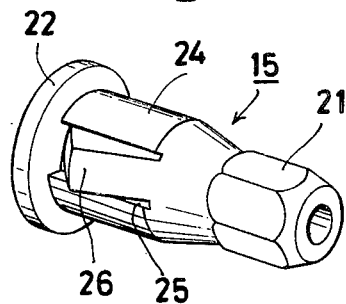
FIG. 5 illustrates a retaining clip for determining the position of the part in the system according to the present invention.
Figure 5:
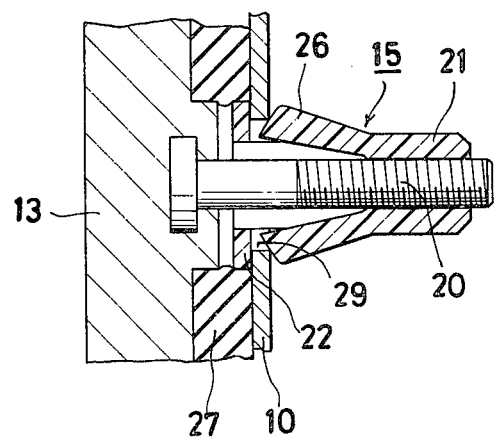
Figure 5:
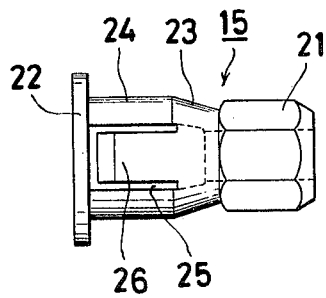

The retaining clips 15 serving to determine the position of the part relative to the automobile body each comprises a stud bolt 20 having the head portion thereof buried in the fixing flange 13 of the lamp 11, a nut portion 21 (FIG. 5) adapted to be screwed on to the stud bolt 20, a positioning cylinder 24 joined at one end thereof to the nut portion 21 via a connecting portion 23 converging toward the aforementioned one end adjoining the nut portion 21 and provided at the other end thereof with a flange portion 22, a pair of angular holes 25 at opposite positions in the outer wall of the cylinder 24, and a pair of deformable engaging claws 26 extending from the nut portion 21 sides of the respective angular holes 25 of the cylinder 24 within the angular holes and having the leading ends thereof, when held in an unstrained condition, protrude from the outer peripheral surface of the cylinder 24. Denoted by 27 is a rubber seal interposed between the automobile body 10 and the fixing flange 13 of the rear combination lamp 11. These retaining clips are molded by an ordinary plastic injection molding method.

As regards the condition in which the retaining clips 14 for absorbing possible positional deviation are fixed to the automobile body, when the retaining clips 14 are inserted into the fixing holes 28 provided in advance at the corresponding positions on the automobile body 10, the grooves 19 on the respective engaging pieces 18 automatically come into engagement resiliently with the edges of the fixing holes as illustrated in FIG. 4(B). In the case of the retaining clips 15 for determining the position of the part relative to the automobile body, the positioning cylinders 24 are inserted into the standard fixing holes 29 bored at the corresponding positions in the automobile body 10 as illustrated in FIG. 5(C), with the result that the flange portions 22 enter into engagement with the outer edges of the standard holes 29 and the leading ends of the engaging claws 26 come into engagement resiliently with the inner edges of the standard holes 29. In the manner described above, the rear combination lamp 11 is fixed on the automobile body 10 through the medium of the retaining clips 14, 15.

Now, the fixation of the rear combination lamp 11 to the automobile body will be specifically described below. As the first step, the retaining clips 14 for absorbing the positional deviation and the retaining clips 15 for determining the position of the lamp on the automobile body are pushed rotatingly onto the respective stud bolts 16, 20 having their head portions buried in the flange 13 of the lamp. Since the bolts are made of a metal and the clips of a plastic material, the bolts act as taps which, when the retaining clips 14 or 15 are rotated thereon, produce threads on the inner walls of the nuts 17, 21 by which the nuts 17, 21 are held in union with the bolts. Of course, such grooves may be formed from the beginning on the inner wall of the nuts 17, 21 and the stud bolts may be made of a plastic material.

After the clips have been fastened to the bolts as described above, the combination lamp 11 is brought to a position such that the flange 13 thereof is exactly opposed across the interposed rubber seal 27 to the edge of the receiving hole 12 formed in the automobile body and the retaining clips 14, 15 are inserted respectively into the fixing holes 28 and the standard fixing holes 29 formed in the edge portion of the receiving hole 12. The engaging pieces 18 of the clips 14, while passing the fixing holes 28, are bent inwardly. On reaching the grooves 19, the engaging pieces 18 are relieved of the inward deformation to some extent. Consequently, the leading ends of the engaging pieces snap into engagement with the edges of the fixing holes. In the meantime, the cylinders 24 of the clips 15 are held in intimate contact with the standard holes so as to keep the lamp 11 accurately in position relative to the automobile body 10 and, at the same time, the engaging claws 26 of the clips 15 are bent inwardly by being passed through the aforementioned standard holes 29 and the leading ends thereof are brought into engagement with the inner edges of the standard fixing holes 29 in consequence of the engagement of the flange portions 22 with the outer edges of the standard holes 29. The aforementioned state of resilient engagement is consequently obtained. Where the intervals between the stud bolts 16, 20 provided on the flange of the rear combination lamp 11 are out of alignment, though even slightly, with those between the fixing holes 28, 29 in the automobile body 10, it is necessary to make it possible for the aforementioned bolts to be inserted into the holes at the misaligned positions and to be brought into fast engagement by a single action for at least one of the clips fastened to the stud bolts to possess the ability to absorb the positional misalignment with at least one of the fixing holes. In the present invention, therefore, the clips 14 for absorbing the positional deviation each incorporate divided engaging pieces 18 in their portions destined to be fastened to the fixing holes and these engaging pieces are normally energized in the diverging direction and are allowed, in their most converged state, to assume an outside diameter smaller than the diameter of the fixing holes. Therefore, when the interval between the two stud bolts 16, 20 planted in a rising state is slightly out of alignment with the interval between the two fixing holes 28, 29 in the automobile body 10, as illustrated in FIG. 6, the retaining clip 15 is inserted into the standard fixing hole 29 so as to position the lamp at the given position and, therefore, if the retaining clip 14 is inserted into the fixing hole 28 with the center thereof deviating slightly from the center of the fixing hole 28, one or more of the divided engaging pieces 18 are bent independently of the remaining engaging pieces, so that the bends in such engaging piece(s) will absorb the discrepancy between the intervals. When the rubber seal 27 is kept in a properly compressed state throughout the entire periphery thereof, the lamp is ideally fixed to the automobile body. If the rubber seal 27 is not perfectly compressed at any part thereof, water leakage may occur. In this case, the trouble can be eliminated by tightening the clip 14 or 15 nearest to the poorly compressed part of the rubber seal. This tightness adjustment is accomplished by causing the clip at the part concerned to be suitably rotated with the nut turned by the finger tips or a suitable tool thereby allowing the clip to be pushed toward the fixing flange and the loose part of the rubber seal to be compressed amply.

By way of illustration, the present invention has been described as applied to the fixation of a rear combination lamp to an automobile body. The invention is not limited to this fixation but may be applied otherwise to the fixation of a side member lamp, for example. The embodiment described above uses two retaining clips 15 for determination of the part's position. The number of such retaining clips need not be limited to two but may be reduced to one depending on the circumstances.

According to the part fixing system of the present invention, the part subjected to fixation is fastened to the object serving to carry the part by combined use of the retaining clips for determining the part's position relative to the object and the retaining clips for absorbing the positional deviation as described above. The part fixing system, therefore, enables the part to be positioned accurately relative to the object. It also permits the part to be fastened to the object by a single action, thus reducing the labor required. Further the fact that individual retaining clips can be adjusted in tightness makes it possible to fasten the part to the object with complete watertightness and the fixation can be obtained with high reliability.

What is claimed is:

1. A part fixing system for fastening a part to an object, which part fixing system accomplishes the union between the part and the object by combined use of a plurality of bolts fixed on said part, comprising in combination with an object a plurality of retaining clips for absorbing positional deviation between the part and the object and at least one retaining clip for determining the position of the part, said plurality of retaining clips for absorbing positional deviation each comprising a nut adapted to be screw-fastened to the bolt and a plurality of deformable engaging pieces extended divergingly from the nut and provided at the leading ends thereof with grooves in resilient engagement with a fixing hole in the object, and said retaining clip for determining the position of the part comprising a nut adapted to be screw-fastened to the bolt, a cylinder joined to the nut, possessed of angular holes in the outer wall thereof and fitting intimately into a standard fixing hole in said object, and engaging claws extending from the nut sides of the angular holes of the cylinder within the angular holes and having the leading ends thereof in resilient engagement with the inner edge of the standard hole.

2. The part fixing system according to claim 1, wherein the number of deformable engaging pieces of each retaining clip for absorbing positional deviation is four and the outside diameter of the most constricted portion thereof is smaller than said fixing hole in the object.

* * * * *